(12) United States Patent
Mihan et al.

(10) Patent No.: US 6,469,111 B1
(45) Date of Patent: Oct. 22, 2002

(54) METHOD FOR POLYMERIZING α-OLEFINS IN A GASEOUS PHASE

(75) Inventors: Shahram Mihan, Lubwigshafen (DE); Arim Lange, Heidelberg (DE); Philipp Rosendorfer, Neustadt (DE); Johannes Hack, Grünstadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/402,894

(22) PCT Filed: Apr. 2, 1998

(86) PCT No.: PCT/EP98/01944

§ 371 (c)(1),
(2), (4) Date: Oct. 13, 1999

(87) PCT Pub. No.: WO98/47928

PCT Pub. Date: Oct. 29, 1998

(30) Foreign Application Priority Data

Apr. 18, 1997 (DE) .......................... 197 16 239

(51) Int. Cl.⁷ .................................................. C08F 2/34
(52) U.S. Cl. ........................... 526/74; 526/78; 526/79; 526/348.2; 526/348.5; 526/348.6; 526/129
(58) Field of Search ............................. 526/74, 78, 79, 526/348.2, 348.5, 348.6, 101, 129

(56) References Cited

U.S. PATENT DOCUMENTS

| | | |
|---|---|---|
| 4,794,096 A | 12/1988 | Ewen |
| 4,857,613 A | 8/1989 | Zolk et al. |
| 4,946,914 A | 8/1990 | Hsieh |
| 5,371,260 A | 12/1994 | Sangokoya |
| 5,391,657 A * | 2/1995 | Song et al. .................... 526/74 |
| 5,391,793 A | 2/1995 | Marks et al. |
| 5,408,015 A * | 4/1995 | Hsieh et al. .................... 526/97 |
| 5,459,217 A * | 10/1995 | Todo et al. .............. 526/348.1 |

FOREIGN PATENT DOCUMENTS

| | | |
|---|---|---|
| DE | 19529240 | 2/1997 |
| EP | 284 708 | 10/1988 |
| EP | 621 279 | 10/1994 |
| WO | 88/02379 | 4/1988 |
| WO | 91/09882 | 7/1991 |

OTHER PUBLICATIONS

Polyolefins, vol. A21, Ency.Ind.Chem. 1992.
J.Org. Chem. 369 (1989). 359–270, Wiesenfeldt et al.

* cited by examiner

Primary Examiner—David W. Wu
Assistant Examiner—William Cheung
(74) Attorney, Agent, or Firm—Keil & Weinakauf

(57) ABSTRACT

α-Olefins are polymerized in the gas phase at from 30 to 150° C. and a pressure of from 5 to 80 bar using a catalyst or a catalyst mixture containing as antistatic agent from 0.1 to 5% by weight of ZnO and/or anhydrous MgO, based on the total amount of the catalyst mixture, except for a process in which the catalyst mixture comprises a chromium catalyst and MgO-supported Ziegler catalyst which is modified with an alkene and with alkylaluminum hydride and also comprises free MgO and the total amount of the MgO is not less than 2% by weight of the catalyst mixture.

9 Claims, No Drawings

METHOD FOR POLYMERIZING α-OLEFINS IN A GASEOUS PHASE The present invention relates to a process for the polymerization of α-olefins in the gas phase at from 30 to 125° C. and a pressure of from 5 to 80 bar.

The present invention further relates to the use of MgO and/or ZnO as. antistatic agent in this polymerization process.

The polymerization of α-olefins in the gas phase frequently results in formation of deposits on the walls of the reactor and to the formation of lumps. This formation of deposits and lumps is at least partially attributable to electrostatic charging. The formation of deposits leads to blockages in the product discharge system and thereby hinders the continuous operation of such gas-phase plants.

Electrostatic charging is influenced in a complex manner by numerous system parameters in the gas-phase polymerization process, for example by the particle size distribution of the polymer and of the catalyst, the chemical composition of the catalyst, the reaction temperature, the reaction pressure and the composition of the circulating gas.

U.S. Pat. No. 5,391,657 describes a method by which deposit formation in gas-phase polymerizations of α-olefins can be prevented by adding inorganic additives (MgO, ZnO, $Al_2O_3$, CuO and mixtures of these) which generate positive charges or inorganic additives ($V_2O_5$, $SiO_2$, $TiO_2$, $Fe_2O_3$ and mixtures of these) which generate negative charges as a function of the particular electrostatic charging situation in the reactor. However, this method requires the continual measurement of the electrostatic charge and also a metering-in system which is regulated in a complex manner as a function of this measurement, and the method is therefore associated with a considerable outlay in terms of apparatus.

Catalysts or catalyst systems which comprise MgO as support material or as a modifying additive are also already known from the literature. Thus, U.S. Pat. No. 5,408,015 describes a catalyst system comprising a chromium oxide catalyst, a Ziegler catalyst supported on MgO and also from about 1 to 15% by weight of MgO as additives. The ratio of chromium oxide catalyst to MgO-supported Ziegler catalyst is from 6:1 to 100:1, so that the overall mixture contains at least 2% by weight of MgO. The addition of MgO makes it possible to prepare ethylene polymers or copolymers (HDPE) having a broad molecular weight distribution and properties which are particularly advantageous for blow molding, applications.

U.S. Pat. No. 4,946,914 describes a supported catalyst which is produced by combining a chromium-containing catalyst with a modifier, viz. an oxide of an element of group IIa of the Periodic Table of the Elements. MgO is mentioned as an example of a modifier. The modifier is added in order to obtain polymers having a higher high load melt index (HLMI) than those obtained using a catalyst system without this modifier. For this purpose, it is said to be important that the modifier contains at least 0.5% by weight, for best results about 2% by weight, of water.

The previously known methods for preventing electrostatic charging in the gas-phase polymerization of α-olefins still leave something to be desired in respect of their effectiveness or their technical complexity.

It is an object of the present invention to find a process for polymerizing α-olefins in the gas phase in which the formation of deposits on the reactor walls and at the bottom of the reactor can be prevented in a simple and efficient manner.

We have found that this object is achieved by a process for the polymerization of α-olefins in the gas phase at from 30 to 150° C. and a pressure of from 5 to 80 bar, wherein use is made of a catalyst or a catalyst mixture containing as antistatic agent from 0.1 to 5% by weight of ZnO and/or anhydrous MgO, based on the total amount of the catalyst mixture except for a process in which the catalyst mixture comprises a chromium catalyst and an Mgo-supported Ziegler catalyst which is modified with an alkene and with alkylaluminum hydride an also comprises tree MgO and the total amount of the MgO is not less than 2% by weight of the catalyst mixture.

The process of the present invention enables especially ethylene and propylene and in particular ethylene to be homopolymerized or copolymerized. Particularly suitable comonomers are α-olefins having from 3 to 8 carbon atoms. A process in which mixtures of ethylene with $C_3$–$C_8$-α-olefins are copolymerized is particularly advantageous. $C_3$–$C_8$-α-olefins which are useful in such a copolymerization are, in particular, propene, butene, pentene, 4-methylpentene, hexene, heptene and octene, and also mixtures of these.

The polymerization process is carried out at from 30 to 125° C., preferably from 80 to 120° C. The pressure is from 5 to 80 bar, preferably from 20 to 60 bar.

The polymerization can be carried out by various gas-phase methods, ie. for example in gas-phase fluidized beds or in stirred gas phases.

The antistatic agent used is ZnO and/or anhydrous MgO. In this context, anhydrous means that the water content of the MgO should be less than 0.5% by weight, preferably less than 0.3% by weight, based on the total mass of the MgO. The ZnO too is preferably used in anhydrous form. The dewatering of the oxides is most simply carried out by heating under reduced pressure, for example to from 150 to 450° C. under reduced pressure. The drying time depends on the temperature selected. Good results are achieved, for example, at 250° C. under reduced pressure for a period of 8 hours.

Among the oxides having an antistatic effect, ZnO is worthy of particular emphasis.

The antistatic agent or the mixture of the two antistatic agents is added to the catalyst or the catalyst mixture in an amount of from 0.1 to 5% by weight, based on the total amount of catalyst or catalyst mixture. The antistatic agent is preferably present in the catalyst or the catalyst mixture in an amount of more than 0.2% by weight and less than 2% by weight.

The oxides which have an antistatic effect can be used in a wide variety of particle sizes. The oxides are particularly effective if they are very fine. Thus, mean particle diameters of from 10 to 200 μm, in particular from 20 to 100 μm, have been found to be particularly useful. Also advantageous are particle diameters which are similar to the size of the catalyst particles.

In the process of the present invention it is possible to use various catalysts as are customary for the polymerization of α-olefins. Thus, suitable catalysts are, for example, the supported chromium catalysts also known as Phillips catalysts.

The application of soluble chromium compounds to support materials is generally known. Suitable support materials are especially inorganic compounds, in particular porous oxides such as $SiO_2$, $Al_2O_3$, MgO, $ZrO_2$, $TiO_2$, $B_2O_3$, CaO, ZnO or mixtures of these. The support materials preferably have a particle diameter of from 1 to 300 μm, in particular from 30 to 70 μm. Examples of particularly preferred supports are silica gels and aluminosilicate gels, preferably those of the formula $SiO_2 \cdot a\, Al_2O_3$, where a is a number from 0 to 2, preferably from 0 to 0.5; these are thus aluminosilicates or silicon dioxide. Such products are commercially available, eg. silica gel 332 from Grace.

The doping of the catalyst support with the chromium-containing active component is generally carried out from a solution or, in the case of volatile compounds, from the gas phase. Suitable chromium compounds are chromium(VI) oxide, chromium salts such as chromium(III) nitrate and chromium(III) acetate, complexes such as chromium(III) acetylacetonate or chromium hexacarbonyl, or else organo-metallic compounds of chromium, eg. bis(cyclopentadienyl) chromium(II), organic esters of chromium(VI) acid or bis(arene)chromium(O).

The active component is generally applied to the support by bringing the support material in a solvent into contact with a chromium compound, removing the solvent and calcining the catalyst at from 400 to 1100° C. For this purpose, the support material can be suspended in a solvent or else in a solution of the chromium compound.

Apart from the chromium-containing active component, further dopants can be applied to the support system. Examples of such possible dopants are compounds of boron, of fluorine, of aluminum, of silicon, of phosphorus and of titanium. These dopants are preferably applied together with the chromium compounds to the support, but can also be applied to the support in a separate step before or after the chromium.

Examples of suitable solvents for doping the support are water, alcohols, ketones, ethers, esters and hydrocarbons.

The concentration of the doping solution is generally 0.1–200 g of chromium compound/l of solvent, preferably 1–50 g/l.

The weight ratio of the chromium compounds to the support during doping is generally from 0.001:1 to 200:1, preferably from 0.005:1 to 100:1.

A preferred embodiment of the invention provides for the chromium catalyst to be produced by adding the desired amount of MgO and/or ZnO to the inactive catalyst precursor and subsequently activating this mixture in a customary manner.

For the activation, the dry catalyst precursor is, for example, calcined at from 400 to 1100° C., in an oxidizing, oxygen-containing atmosphere in a fluidized-bed reactor. Cooling is preferably carried out under an inert gas atmosphere in order to prevent adsorption of oxygen. This calcination can also be carried out in the presence of fluorine compounds such as ammonium hexafluorosilicate, as a result of which the catalyst surface is modified with fluorine atoms. The calcination is preferably carried out at from 500 to 800° C.

Furthermore, Ziegler catalysts or Ziegler-Natta catalysts can also be used in the process of the present invention. Customary catalysts of this type are described, for example, in Ullmann's Encyclopedia of Industrial Chemistry, Vol. A 21, 4th Edition 1992, p. 502 ff. Particular mention should here be made of those catalysts as are described, for example, in U.S. Pat. No. 4,857,613 and in DE-A-19 529 240.

In a further preferred embodiment of the process of the present invention, a metallocene catalyst is used as catalyst or as constituent of the catalyst mixture.

Suitable metallocene catalysts are, for example, those in which the particulate organic or inorganic support material used is a polyolefin such as polyethylene, polypropylene, poly-1-butene or polymethyl-1-pentene or a copolymer comprising the monomers on which these polymers are based, or else a polyester, polyamide, polyvinyl chloride, polyacrylate, polymethacrylate or polystyrene. However, preference is given to inorganic support materials such as porous oxides, eg. $SiO_2$, $Al_2O_3$, MgO, $ZrO_2$, $TiO_2$, $B_2O_3$, CaO, ZnO. Metal halides such as $MgCl_2$ are also suitable as supports. The support materials preferably have a particle diameter of from 1 to 300 $\mu$m, in particular from 30 to 70 $\mu$m. Particularly preferred supports are, for example, silica gels, preferably those of the formula $SiO_2 \cdot a\,Al_2O_3$, where a is a number from 0 to 2, preferably from 0 to 0.5; these are thus aluminosilicates or silicon dioxide. Such products are commercially available, eg. silica gel 332 from Grace.

Particularly suitable metallocene catalysts are those comprising metallocene complexes of the formula I

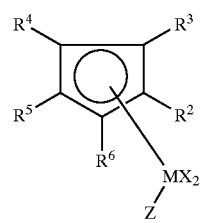

were the substituents have the following meanings:

M is titanium, zirconium, hafnium, vanadium, niobium or tantalum

X is fluorine, chlorine, bromine, iodine, hydrogen, $C_1$–$C_{10}$–alkyl, $C_6$–$C_{15}$-aryl, alkylaryl having from 1 to 10 carbon atoms in the alkyl radical and from 6 to 20 carbon atoms in the aryl radical, —$OR^7$ or —$NR^7R^8$, where $R^7$ and $R^8$ are $C_1$–$C_{10}$-alkyl, $C_6$–$C_{15}$-aryl, alkylaryl, arylalkyl, fluoroalkyl or fluoroaryl each having from 1 to 10 carbon atoms in the alkyl radical and from 6 to 20 carbon atoms in the aryl radical, $R^2$ to $R^6$ are hydrogen, $C_1$–$C_{10}$-alkyl, 5- to 7-membered cycloalkyl which may in turn bear a $C_1$–$C_{10}$-alkyl as substituent, $C_6$–$C_{15}$-aryl or arylalkyl, where two adjacent radicals may also together form a saturated or unsaturated cyclic group having from 4 to 15 carbon atoms, or $Si(R^9)_3$ where $R^9$ is $C_1$–$C_{10}$-alkyl, $C_3$–$C_{10}$-cycloalkyl or $C_6$–$C_{15}$-aryl,

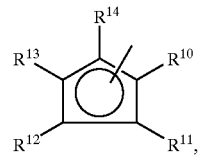

where the radicals $R^{10}$ to $R^{14}$ are hydrogen, $C_1$–$C_{10}$-alkyl, 5- to 7-membered cycloalkyl which may in turn bear a $C_1$–$C_{10}$-alkyl as substituent, $C_6$–$C_{15}$-aryl or arylalkyl, where two adjacent radicals may also together form a saturated or unsaturated cyclic group having from 4 to 15 carbon atoms, or $Si(R^{15})_3$ where $R^{15}$ is $C_1$–$C_{10}$-alkyl, $C_6$–$C_{15}$-aryl or $C_3$–$C_{10}$-cycloalkyl, or the radicals $R^5$ and Z together form a —$R^{16}$—A— group, where $$\begin{matrix} R^{17} \\ -M^2- \\ R^{18} \end{matrix}, \quad \begin{matrix} R^{17} & R^{17} \\ -M^2-M^2- \\ R^{18} & R^{18} \end{matrix}, \quad \begin{matrix} R^{17} \\ -M^2-CR_2{}^{19}- \\ R^{18} \end{matrix},$$

$$\begin{matrix} R^{17} \\ -C- \\ R^{18} \end{matrix}, \quad \begin{matrix} R^{17} \\ -O-M^2- \\ R^{18} \end{matrix}, \quad \begin{matrix} R^{17} & R^{17} \\ -C-C- \\ R^{18} & R^{18} \end{matrix},$$

$=BR^{17}$, $=AlR^{17}$, —Ge—, —Sn—, —O—, —S—, $=SO$, $=SO_2$, $=NR^{17}$, $=CO$, $=PR^{17}$ or $=P(O)R^{17}$, where $R^{17}$, $R^{18}$ and $R^{19}$ are identical or different and are each a hydrogen atom, a halogen atom, a $C_1$–$C_{10}$-alkyl group, a $C_1$–$C_{10}$-fluoroalkyl group, a $C_6$–$C_{10}$-fluoroaryl group, a $C_6$–$C_{10}$-aryl group, a $C_1$–$C_{10}$-alkoxy group, a $C_2$–$C_{10}$-alkenyl group, a $C_7$–$C_{40}$-arylalkyl group, a $C_8$–$C_{40}$-arylalkenyl group or a $C_7$–$C_{40}$-alkylaryl group or two adjacent radicals in each case together with the atoms connecting them form a ring, and $M^2$ is silicon, germanium or tin, A is —O—, —S—, $$\diagdown \mathrm{NR^{20}} \quad \text{or} \quad \diagdown \mathrm{PR^{20}},$$

where $R^{20}$ is $C_1$–$C_{10}$-alkyl, $C_6$–$C_{15}$-aryl, $C_3$–$C_{10}$-cycloalkyl, alkylaryl or $Si(R^{21})_3$, $R^{21}$ is hydrogen, $C_1$–$C_{10}$-alkyl, $C_6$–$C_{15}$-aryl which in is turn may bear $C_1$–$C_4$-alkyl groups as substituents, or $C_3$–$C_{10}$-cycloalkyl or the radicals $R^5$ and $R^{13}$ together form an —$R^{16}$— group.

Among the metallocene complexes of the formula I, preference is given to

[Structures Ia, Ib, Ic, Id shown with cyclopentadienyl rings bearing substituents $R^2$, $R^3$, $R^4$, $R^5$, $R^6$, $R^{10}$, $R^{11}$, $R^{12}$, $R^{13}$, $R^{14}$, $R^{16}$ and metal center $MX_3$ or $MX_2$, with bridging group A]

Particular preference is given to those transition metal complexes which contain two aromatic ring systems bridged to one another as ligands, ie. particularly the transition metal complexes of the formulae Ib and Ic.

The radicals X can be identical or different but are preferably identical.

Among the compounds of the formula Ia, particular preference is given to those in which M is titanium, zirconium or hafnium, X is chlorine, $C_1$–$C_4$-alkyl or phenyl and $R^2$ to $R^6$ are hydrogen or $C_1$–$C_4$-alkyl.

Preferred compounds of the formula Ib are those in which

M is titanium, zirconium or hafnium,

X is chlorine, $C_1$–$C_4$-alkyl or phenyl, $R^2$ to $R^6$ are hydrogen, $C_1$–$C_4$-alkyl or $Si(R^9)_3$, $R^{10}$ to $R^{14}$ are hydrogen, $C_1$–$C_4$-alkyl or $Si(R^{15})_3$.

Particularly suitable compounds of the formula Ib are those in which the cyclopentadienyl radicals are identical.

Examples of particularly suitable compounds are:
bis(cyclopentadienyl)zirconium dichloride,
bis(pentamethylcyclopentadienyl)zirconium dichloride,
bis(methylcyclopentadienyl)zirconium dichloride,
bis(ethylcyclopentadienyl)zirconium dichloride,
bis(n-butylcyclopentadienyl)zirconium dichloride and
bis(trimethylsilylcyclopentadienyl)zirconium dichloride
and also the corresponding dimethylzirconium compounds.

Particularly useful compounds of the formula Ic are those in which $R^2$ and $R^{10}$ are identical and are hydrogen or $C_1$–$C_{10}$-alkyl, $R^6$ and $R^{14}$ are identical and are hydrogen, methyl, ethyl, isopropyl or tert-butyl, $R^3$, $R^4$, $R^{11}$ and $R^{12}$ have the meanings: $R^4$ and $R^{12}$ are $C_1$–$C_4$-alkyl, $R^3$ and $R^{11}$ are hydrogen or two adjacent radicals $R^3$ and $R^4$ or $R^{11}$ and $R^{12}$ may in each case together form a cyclic group having from 4 to 12 carbon atoms,

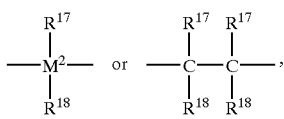

M is titanium, zirconium or hafnium and

X is chlorine, $C_1$–$C_4$-alkyl or phenyl.

Examples of particularly useful complexes are:
dimethylsilanediylbis(cyclopentadienyl)zirconium dichloride,
dimethylsilanediylbis(indenyl)zirconium dichloride,
dimethylsilanediylbis(tetrahydroindenyl)zirconium dichloride,
ethylenebis(cyclopentadienyl)zirconium dichloride,
ethylenebis(indenyl)zirconium dichloride,
ethylenebis(tetrahydroindenyl)zirconium dichloride,
tetramethylethylene-9-fluorenylcyclopentadienylzirconium dichloride,
dimethylsilanediylbis(3-tert-butyl-5-methylcyclopentadienyl)zirconium dichloride,
dimethylsilanediylbis(3-tert-butyl-5-ethylcyclopentadienyl)zirconium dichloride,
dimethylsilanediylbis(2-methylindenyl)zirconium dichloride,
dimethylsilanediylbis(2-isopropylindenyl)zirconium dichloride,
dimethylsilanediylbis(2-tert-butylindenyl)zirconium dichloride,
diethylsilanediylbis(2-methylindenyl)zirconium dibromide,
dimethylsilanediylbis(3-methyl-5-methylcyclopentadienyl)zirconium dichloride,
dimethylsilanediylbis(3-ethyl-5-isopropylcyclopentadienyl)zirconium dichloride,
dimethylsilanediylbis(2-methylindenyl)zirconium dichloride,
dimethylsilanediylbis(2-methylbenzindenyl)zirconium dichloride
dimethylsilanediylbis(2-ethylbenzindenyl)zirconium dichloride,
dimethylphenylsilanediylbis(2-ethylbenzindenyl)zirconium dichloride,
methylphenylsilanediylbis(2-methylbenzindenyl)zirconium dichloride,
diphenylsilanediylbis(2-methylbenzindenyl)zirconium dichloride,
diphenylsilanediylbis(2-ethylbenzindenyl)zirconium dichloride,
and dimethylsilanediylbis(2-methylindenyl)hafnium dichloride and also the corresponding dimethylzirconium compounds.

Particularly useful compounds of the formula Id are those in which

M is titanium or zirconium,

X is chlorine, $C_1$–$C_4$-alkyl or phenyl,

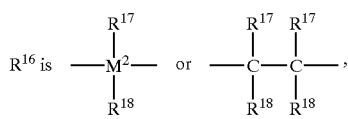

A is —O—, —S—,

and $R^2$ to $R^4$ and $R^6$ are hydrogen, $C_1$–$C_{10}$-alkyl, $C_3$–$C_{10}$-cycloalkyl, $C_6$–$C_{15}$-aryl or $Si(R^9)_3$ or two adjacent radicals can form a cyclic group having from 4 to 12 carbon atoms.

The synthesis of such complexes can be carried out by methods known per se, with preference being given to reacting the corresponding substituted, cyclic hydrocarbon anions with halides of titanium, zirconium, hafnium, vanadium, niobium or tantalum.

Examples of appropriate preparative methods are described in, inter alia, Journal of Organometallic Chemistry, 369 (1989), 359–370.

It is also possible to use mixtures of various metallocene complexes.

As a further component, a compound capable of forming metallocenium ions is also usually present in the catalyst prepared by the process of the present invention.

Suitable compounds capable of forming metallocenium ions are strong, uncharged Lewis acids, ionic compounds having Lewis acid cations and ionic compounds having Brönsted acids as cations.

As strong, uncharged Lewis acids, preference is given to compounds of the formula II $$M^3X^1X^2X^3 \qquad\qquad II$$

where $M^3$ is an element of main group III of the Periodic Table, in particular B, Al or Ga, preferably B, $X^1$, $X^2$ and $X^3$ are hydrogen, $C_1$–$C_{10}$-alkyl, $C_6$–$C_{15}$-aryl, alkylaryl, arylalkyl, haloalkyl or haloaryl each having from 1 to 10 carbon atoms in the alkyl radical and from 6 to 20 carbon atoms in the aryl radical, or fluorine, chlorine, bromine or iodine, in particular haloaryls, preferably pentafluorophenyl.

Particular preference is given to compounds of the formula II in which $X^1$, $X^2$ and $X^3$ are identical, preferably tris(pentafluorophenyl)borane.

Suitable ionic compounds having Lewis acid cations are compounds of the formula III $$[(Y^{a+})Q_1Q_2 \ldots Q_z]^{d+} \qquad\qquad III$$

where

Y is an element of main groups I to VI or transition groups I to VIII of the Periodic Table, $Q_1$ to $Q_z$ are groups bearing a single negative charge, eg. $C_1$–$C_{28}$-alkyl, $C_6$–$C_{15}$-aryl, alkylaryl, arylalkyl, haloalkyl, haloaryl each having from 6 to 20 carbon atoms in the aryl radical and from 1 to 28 carbon atoms in the alkyl radical, $C_1$–$C_{10}$-cycloalkyl which may bear $C_1$–$C_{10}$-alkyl groups as substituents, halogen, $C_1$–$C_{28}$-alkoxy, $C_6$–$C_{15}$-aryloxy, silyl or mercaptyl groups, a is an integer from 1 to 6, z is an integer from 0 to 5, d is the difference a–z, but d is greater than or equal to 1.

Particularly useful cations are carbonium cations, oxonium cations and sulfonium cations and also cationic transition metal complexes. Particular mention may be made of the triphenylmethyl cation, the silver cation and the 1,1'-dimethylferrocenyl cation. They preferably have noncoordinating counterions, in particular boron compounds as are also mentioned in WO 91/09882, preferably tetrakis(pentafluorophenyl)borate.

Ionic compounds having Brönsted acids as cations and preferably likewise noncoordinating counterions are mentioned in WO 91/09882; the preferred cation is N,N-dimethylanilinium.

Particularly useful compounds capable of forming metallocenium ions are open-chain or cyclic aluminoxane compounds of the formula IV or V

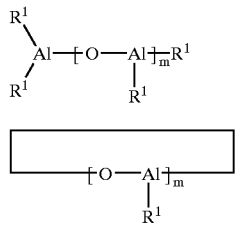

where $R^1$ is $C_1$–$C_4$-alkyl, preferably methyl or ethyl, and m is an integer from 5 to 30, preferably from 10 to 25.

The preparation of these oligomeric aluminoxane compounds is usually carried out by reacting a solution of trialkylaluminum with water and is described, inter alia, in EP-A 284 708 and U.S. Pat. No. 4,794,096.

In general, the oligomeric aluminoxane compounds obtained in this way are in the form of mixtures of chain molecules of various lengths, both linear and cyclic, so that m is to be regarded as a mean value. The aluminoxane compounds can also be present in admixture with other metal alkyls, preferably aluminum alkyls.

Other compounds which can be used as compounds capable of forming metallocenium ions are aryloxyaluminoxanes as described in U.S. Pat. No. 5,391,793, aminoaluminoxanes as described in U.S. Pat. No. 5,371,260, aminoaluminoxane hydrochlorides as described in EP-A 633 264, siloxyaluminoxanes as described in EP-A 621 279 or mixtures thereof.

The process of the present invention leads to a considerable reduction in deposit formation in the gas-phase reactor and thus to significantly longer running times. This requires no additional installations and no additional regulating systems. The following examples illustrate the process.

EXAMPLES

Example 1

Production of a Supported Chromium Catalyst 185 g of silica gel (SG 332, from Grace, Germany) were suspended in 400 ml of a 3.56% strength by weight solution of $Cr(NO_3)_3 \cdot 9H_2O$ in methanol. The methanol was subsequently distilled off under reduced pressure and this catalyst precursor was activated at 650° C. in the presence of oxygen.

Example 2

Production of an Antistatically Modified Chromium Catalyst

The oxides having an antistatic effect (mean particle size 50 μm) were dried at 250° C. under reduced pressure for 8 hours and subsequently flushed with nitrogen. The oxide powder was then mixed in the ratios indicated in Table 1 with the catalyst precursor produced as in Example 1. This mixture was subsequently activated at 650° C. in the presence of oxygen.

Examples 3 to 10

Polymerization of Ethylene in the Presence of the Antistatic Oxides

The polymerization experiments were carried out in the gas phase at 110° C. and an ethylene pressure of 40 bar in a stirred 1l autoclave. The electrostatic potential was measured during the polymerization using a probe as is customary for the measurement of electrostatic charging. The reaction times and the experimental results are shown in Table 1.

TABLE 1

Polymerization of ethylene in the presence of MgO and/or ZnO

| Ex. | Modified catalysts produced from | Oxide content [%] | Polymer density [g/cm³] | Yield [g] | Productivity g of PE/g of cat. | Polymerization time [min] | Electric potential [V] |
|---|---|---|---|---|---|---|---|
| 3 | Precursor (55.30 g) and MgO (0.56 g) | 1.0 | 0.9551 | 135 | 2000 | 90 | ±75 |
| 4 | Precursor (43.51 g) and MgO (0.22 g) | 0.5 | 0.9558 | 205 | 2700 | 60 | ±80 |
| 5 | Activated catalyst (45.63 g) and MgO (0.46 g) | 1.0 | 0.9518 | 160 | 2600 | 90 | ±70 |
| 6 | Activated catalyst (49.73 g) and MgO (0.25 g) | 0.5 | 0.9560 | 200 | 2900 | 90 | ±85 |
| 7 | Precursor (48.52 g) and ZnO (0.49 g) | 1.0 | 0.9534 | 260 | 4200 | 80 | ±60 |
| 8 | Precursor (53.23 g) and ZnO (0.27 g) | 0.5 | 0.9526 | 185 | 3700 | 90 | ±75 |
| 9 | Activated catalyst (46.45 g) and ZnO (0.47 g) | 1.0 | 0.9545 | 240 | 4000 | 90 | ±60 |
| 10 | Activated catalyst (46.45 g) and ZnO (0.21 g) | 0.5 | 0.9563 | 240 | 4600 | 90 | ±65 |
|  | Comparative example |  | 0.9549 | 225 | 2600 | 70 | −2500 |

TABLE 1-continued

Polymerization of ethylene in the presence of MgO and/or ZnO

| Ex. | Modified catalysts produced from | Oxide content [%] | Polymer density [g/cm³] | Yield [g] | Productivity g of PE/g of cat. | Polymerization time [min] | Electric potential [V] |
|---|---|---|---|---|---|---|---|
|  | without antistatic agent |  |  |  |  |  |  |
|  | without antistatic agent |  |  |  |  |  |  |
|  | Comparative example |  | 0.9506 | 210 | 2600 | 70 | −2300 |

We claim:

1. A process for the gas phase polymerization of α-olefins which comprises: 1) polymerizing the α-olefins at temperatures of from 30 to 150° C. and pressures of from 5 to 80 bar, 2) in the presence of a catalyst mixture containing a) a catalyst and b) 0.1 to 5% by weight, based on the total amount of the catalyst mixture, ZnO and/or anhydrous MgO as an antistatic agent, and where 3) said catalyst mixture does not comprise: a) a chromium catalyst, and b) a MgO-supported Ziegler catalyst modified both with an alkene and with alkylaluminum hydride, and c) free MgO, where the total amount of MgO is not less than 2% by weight of the catalyst mixture, wherein the catalyst and the ZnO and/or MgO antistatic agent are premixed prior to contact with the olefins.

2. A process as claimed in claim 1, wherein a supported chromium catalyst is used as a constituent of the catalyst mixture.

3. A process as claimed in claim 2, wherein the chromium catalyst is prepared by adding the desired amount of MgO and/or ZnO to the inactive catalyst precursor and subsequently activating this mixture in a customary manner.

4. A process as claimed in claim 1, wherein a Ziegler catalyst or Ziegler-Natta catalyst is used as a constituent of the catalyst mixture.

5. A process for the gas phase polymerization of α-olefins which comprises: 1) polymerizing the α-olefins at temperatures of from 30 to 150° C. and pressures of from 5 to 80 bar, 2) in the presence of a catalyst mixture containing a) a metallocene catalyst and b) from 0.1 to 5% by weight, based on the total amount of the catalyst mixture, ZnO and/or anhydrous MgO as an antistatic agent, and where 3) said catalyst mixture does not comprise: a) a chromium catalyst, and b) a MgO-supported Ziegler catalyst modified both with an alkene and with alkylaluminum hydride, and: c) free MgO, where the total amount of MgO is not less than 2% by weight of the catalyst mixture, wherein the catalyst and the ZnO and/or MgO antistatic agent are premixed prior to contact with the olefins.

6. A process for the gas phase polymerization of α-olefins which comprises: 1) polymerizing the α-olefins at temperatures of from 30 to 150° C. and pressures of from 5 to 80 bar, 2) in the presence of a catalyst mixture containing a) a catalyst and b) from 0.1 to 5% by weight, based on the total amount of the catalyst mixture, ZnO as an antistatic agent, and where 3) said catalyst mixture does not comprise: a) a chromium catalyst, and b) a MgO-supported Ziegler catalyst modified both with an alkene and with alkylaluminum hydride, and c) free MgO, where the total amount of MgO is not less than 2% by weight of the catalyst mixture wherein, the catalyst and the ZnO and/or MgO antistatic agent are premixed prior to contact with the olefins.

7. A process as claimed in claim 1, wherein the antistatic agent is present in the catalyst mixture in an amount of more than 0.2% by weight and less than 2% by weight.

8. A process as claimed in claim 1, wherein ethylene is polymerized as α-olefin.

9. A process as claimed in claim 1, wherein a mixture of ethylene with $C_3$–$C_8$-α-olefins is copolymerized as α-olefins.

* * * * *